Feb. 5, 1929.

S. E. MEYERS

SAFETY VALVE

Filed Aug. 6, 1925

1,701,305

INVENTOR
SIDNEY E. MEYERS
BY *William J. Wardale*
ATTORNEY

Patented Feb. 5, 1929.

1,701,305

UNITED STATES PATENT OFFICE.

SIDNEY E. MEYERS, OF BUFFALO, NEW YORK, ASSIGNOR TO NATIONAL ANILINE & CHEMICAL CO., INC., OF NEW YORK, N. Y., A CORPORATION OF NEW YORK.

SAFETY VALVE.

Application filed August 6, 1925. Serial No. 48,507.

This invention relates to safety valves and in particular to valves for high pressure use.

An object of this invention is a valve that is positively seating under the high pressures for which it is intended. A further object is the provision of tension means for holding the closure to its seat and avoiding its accidental displacement. Another object is a balanced pressure condition to avoid chattering and secure a prompt action of the valve. These and other objects will appear from the description which follows.

Figure 1:
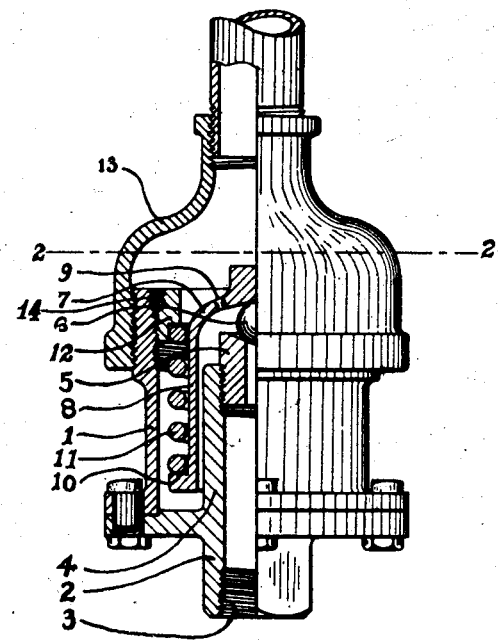
Fig. 1 is an elevation partly in section, of an embodiment of the invention.
Figure 2:
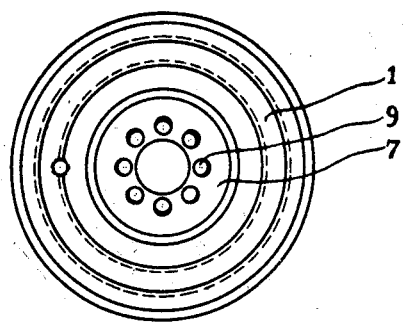
Fig. 2 is a horizontal section on the line 2—2 of Fig. 1.

A valve casing 1 has bolted to its lower end a flanged hollow or annular member 2 which has an internally threaded portion 3 for attachment to the container to be relieved. The member 2 also has an inwardly extending portion 4 spaced from the casing 1 into which the valve seat 5 is threaded. A metal ball 6 closes the orifice in the valve seat, and the seat is given a concaved shape to direct the ball to its place over the orifice. A cup shaped cap or casing 7 has a concaved surface contacting the ball and thereby positively directs the ball to its seat. The cap has an annular skirt 8 which envelopes and extends beyond the valve seat. Perforations 9 in the cap permit the direct escape of fluid from the valve without necessitating its passage within the skirt.

On the edge of the annular skirt 8, a flange 10 is formed to serve as a seat for one end of a compression spring 11. The other end of the spring is confined by the upper end of the casing 1 which has a ring 12 adjustably threaded therein and is locked in position by a screw inserted in the threaded hole 14. A reducing coupling 13 is secured externally of the upper end of the casing; but the coupling is not essential to the valve operation and may be omitted.

In operation, when the pressure of the fluid on the ball is sufficient to compress the spring, the ball and the cap in contact with it, are lifted against the compression of the spring sufficiently to permit the escape of fluid, which thereupon passes through the perforations and also within the depending skirt of the cap, and thence out through the coupling or into the atmosphere.

With this construction, the force of the spring is transmitted to the valve in the direction of the orifice from a plane beyond the valve seat. Therefore, there is a compression stress exerted on the valve. While the tension is on the cap, the resultant effect is the stability and positive seating which would be obtained with a direct tension connection to the closure. The positive seating of the valve is assured by the concaved surfaces which contact the ball.

The cap extension or skirt about the valve seat also gives a compact arrangement that confines the motion of the surrounding spring and prevents its distortion. In so far as the cap moves and is in constant contact with the ball, the cap forms a part of the closure. Any other seat contacting means may be substituted for the ball, or the cap itself may be given a surface cooperating with the seat. The ball, however, gives the added advantage of an accurately formed closure member that prevents leakage at the high pressures involved, while at the same time, it is inexpensive and readily assembled. The ball type of closure is furthermore adapted for orifices of small caliber, because of its accurate configuration.

The perforations in the cap may be omitted, but with their presence, balanced pressure conditions on both sides of the cap are instantaneously established, when fluid is released or when the valve closes. This balanced condition avoids fluttering or chattering of the valve during its operation.

I claim:

1. A safety valve comprising a ball, a seat for said ball, said seat having an orifice therein, a member, said seat and member having concaved surfaces contacting the ball for maintaining it over the orifice, said member having a portion extending beyond and enveloping said seat, and means acting on the extended portion of the member for drawing said ball to its seat.

2. A safety valve comprising a closure, a seat for said closure, an enveloping member movable with said closure, a flange on said member, a spring contacting said flange, an enclosing casing, and a ring adjustably mounted in said casing for confining the spring.

3. A safety valve comprising a casing, a hollow member extending inwardly into and spaced from said casing and having a valve seat thereon, a cap enveloping said member, a closure for said valve seat between said member and said cap, and a spring about said cap and in contact with said casing.

4. A safety valve comprising a casing, an annular member extending inwardly into and spaced from said casing and having a valve seat thereon, a cap having a skirt enclosing said member, a closure for said valve seat between said cap and said member, and a helical spring about said skirt and in contact with said casing.

5. A safety valve comprising a casing, an annular member extending inwardly into and spaced from said casing and having a valve seat thereon, a cap having a skirt enclosing said member, a closure for said valve between said cap and said member, a flange extending from the skirt of said cap, and a helical spring about said skirt and in contact with said flange and said casing.

6. A safety valve comprising a closure, a seat for said closure, a casing about said seat and said closure, said casing having a vent, a movable member within said casing acting upon and enveloping said closure, said movable member being perforated to maintain balanced pressure conditions, and yielding means acting on said movable member for drawing said closure to its seat.

7. A safety valve comprising a closure, a seat for said closure, said seat having an orifice therein, a movable member having a portion extending beyond and enveloping said seat, and yielding means partially enclosing and acting on the extending portion of said member for drawing said closure to its seat.

8. A safety valve comprising a closure, a seat for said closure, said seat having an orifice therein, a movable member having a portion extending beyond and enveloping said seat, a casing enclosing said member, and yielding means contacting with said casing and said member for drawing said closure to its seat.

In testimony whereof I affix my signature.

SIDNEY E. MEYERS.